(12) United States Patent
Jung et al.

(10) Patent No.: US 7,409,129 B2
(45) Date of Patent: Aug. 5, 2008

(54) OPTICAL FIBER ARRAY MODULE, FABRICATION METHOD THEREOF, AND PORTABLE TERMINAL

(75) Inventors: Sun-Tae Jung, Anyang-si (KR); Hyun-Cheol Kim, Gwangju (KR); Je-Oh Kim, Gwangju (KR); Hyun-Cheual Choi, Gwangju (KR); Hyun-Joo Moon, Gwangju (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/497,834

(22) Filed: Aug. 2, 2006

(65) Prior Publication Data

US 2007/0133929 A1    Jun. 14, 2007

(30) Foreign Application Priority Data

Dec. 9, 2005    (KR) .................... 10-2005-0120761

(51) Int. Cl.
    *G02B 6/04*    (2006.01)
(52) U.S. Cl. ................. 385/115; 385/121; 385/137
(58) Field of Classification Search .............. None
    See application file for complete search history.

(56) References Cited

U.S. PATENT DOCUMENTS

| | | | | |
|---|---|---|---|---|
| 3,912,362 | A | * | 10/1975 | Hudson .................... 385/54 |
| 3,950,075 | A | * | 4/1976 | Cook et al. ................ 385/93 |
| 4,127,319 | A | * | 11/1978 | Forney et al. ............... 385/81 |
| 4,360,372 | A | | 11/1982 | Maciejko .................. 65/4.21 |
| 4,908,567 | A | * | 3/1990 | Welker et al. ............. 323/299 |
| 4,973,128 | A | * | 11/1990 | Hodges ................... 385/116 |
| 5,191,388 | A | * | 3/1993 | Kilham .................... 356/335 |
| 5,511,141 | A | * | 4/1996 | Peli ......................... 385/116 |
| 7,015,444 | B2 | * | 3/2006 | Kawano et al. .......... 250/201.3 |
| 2003/0210537 | A1 | * | 11/2003 | Engelmann ................ 362/26 |
| 2006/0261984 | A1 | * | 11/2006 | Jung et al. ................. 341/31 |

FOREIGN PATENT DOCUMENTS

| | | |
|---|---|---|
| EP | 0400856 | 12/1990 |
| EP | 0898184 | 2/1999 |
| WO | WO2004/068204 | 8/2004 |
| WO | WO 2005-062089 A1 | 7/2005 |

\* cited by examiner

*Primary Examiner*—Rodney Bovernick
*Assistant Examiner*—Mike Stahl
(74) *Attorney, Agent, or Firm*—Cha & Reiter, LLC

(57) ABSTRACT

An optical fiber array module is provided. The optical fiber array module includes a light emitting device to emit light having a pre-set convergence angle through a side surface (having a window or opening) thereof; an optical fiber array including a plurality of optical fibers (each optical fiber being an optical transmission medium); and a concentrator having a first side surface, a second side surface facing the side surface of the light emitting device, and a through-hole extended from the first side surface to the second side surface, wherein the through-hole has a width gradually narrower in a direction from the first side surface to the second side surface, wherein an end portion of the optical fiber array is inserted into the through-hole, thereby enabling concentration of the end portion of the optical fiber array d.

15 Claims, 10 Drawing Sheets

OPTICAL FIBER ARRAY MODULE, FABRICATION METHOD THEREOF, AND PORTABLE TERMINAL

CLAIM OF PRIORITY

This application claims priority under 35 U.S.C. § 119 to an application entitled "Optical Fiber Array Module, Fabrication Method thereof, and Portable Terminal," filed in the Korean Intellectual Property Office on Dec. 9, 2005 and assigned Serial No. 2005-120761, the contents of which are incorporated herein by reference.

BACKGROUND OF THE INVENTION

1. Field of the Invention

The present invention relates generally to an optical fiber array, and in particular, to an optical fiber array module including a light emitting device and an optical fiber array.

2. Description of the Related Art

Optical fiber arrays are composed of a plurality of optical fibers arranged in parallel. Each optical fiber is an optical transmission medium and can selectively include a protection layer of a resin substance, which is coated on the outer surface of the plurality of optical fibers. The protection layer is used to fix the plurality of optical fibers. Optical fiber array modules structure aligns an optical fiber array and a light emitting device. A side view light emitting diode (LED) is conventionally used as the light emitting device. Such an optical fiber array module is used as a backlight to illuminate key tops of a portable terminal.

FIG. 1 is a plan view of a conventional optical fiber array module 100. FIG. 2 is a perspective view of a side view LED 110 illustrated in FIG. 1. Referring to FIGS. 1 and 2, the optical fiber array module 100 includes the side view LED 110 for generating light and an optical fiber array 120 coupling a light beam 116 emitted from the side view LED 110 therein.

The side view LED 110 includes a rectangular type window 114 on one side surface 112 thereof. The side view LED 110 emits the light beam 116 having a pre-set divergence angle from the window 114. A horizontal width $W_1$ (hereinafter, width) of the window 114 is 1.9 mm, and a vertical width (hereinafter, length) of the window 114 is 0.46 mm.

The optical fiber array 120 is composed of 28-core plastic optical fibers 122. Each optical fiber is an optical transmission medium and is arranged in parallel. The optical fiber array 120 can also selectively include a protection layer of a resin substance, which is coated on the outer surface of the 28-core plastic optical fibers 122, to fix the 28-core plastic optical fibers 122. Each of the 28-core plastic optical fibers 122 includes a core and a clad. The core has a high refractive index in which light travels with total reflection. The clad has a low refractive index and surrounds the core. The width $W_3$ of the optical fiber array 120 is 7 mm, and the diameter $W_2$ of each of the 28-core plastic optical fibers 122 is 0.25 mm.

For efficient optical coupling, it is preferable to minimize the distance between the window 114 of the side view LED 110 and an end portion of the optical fiber array 120. However, since the width $W_1$ of the window 114 is narrower than the width $W_3$ of the optical fiber array 120 and the divergence angle of the side view LED 110 is narrow, reduction of the distance is limited.

A technique of widening a divergence angle of an LED using a grating has been disclosed. However, luminance distribution of light is not uniform within the widened divergence angle. Thus, in practice, an effective divergence angle for obtaining uniform luminance is not changed. In addition, optical coupling efficiency is low, since the distance between a window of the LED and an end portion of an optical fiber array is still large.

As described above, in conventional optical fiber array modules, luminance of light coupled to the optical fiber array is low, since the distance between a window of an LED and an end portion of an optical fiber array must be more than several or tens mm.

Thus, there is a need in the art for an optical fiber array module for maximizing optical coupling efficiency by minimizing the distance between a window of an LED and an end portion of an optical fiber array.

SUMMARY OF THE INVENTION

An object of the present invention is to reduce or overcome at least the above problems and/or disadvantages in the art. Accordingly, an object of the present invention is to provide an optical fiber array module for maximizing optical coupling efficiency by minimizing the distance between a window of a light emitting diode (LED) and an end portion of an optical fiber array, a fabrication method thereof, and a portable terminal.

According to the principles of the present invention, an optical fiber array module is provided. The optical fiber array module includes a light emitting device to emit light having a pre-set convergence angle through a side surface thereof; an optical fiber array having a plurality of optical fibers; and a concentrator including a first side surface, a second side surface facing the window of the light emitting device, and a through-hole extended from the first side surface to the second side surface, wherein the through-hole has a width gradually narrower in a direction from the first side surface to the second side surface, wherein an end portion of the optical fiber array is inserted into the through-hole, thereby enabling concentration of the end portion of the optical fiber array.

Further, according to the principles of the present invention, a method of fabricating an optical fiber array module is provided. The method including the steps of: (a) providing an optical fiber array comprising a plurality of optical fibers; (c) concentrating an end portion of the optical fiber array; and (d) aligning a light emitting device and the concentrated optical fiber array so that a side surface of the light emitting device faces the end of the optical fiber array.

Still further, according to principles of the present invention, a portable terminal is provided. The portable terminal including a light emitting device to emit light having a pre-set convergence angle through a window included on one side surface thereof; an optical fiber array comprising a plurality of optical fibers; and a concentrator having a first side surface, a second side surface facing the window of the light emitting device, and a through-hole extended from the first side surface to the second side surface, wherein the through-hole has a width gradually narrower in a direction from the first side surface to the second side surface, wherein an end portion of the optical fiber array is inserted into the through-hole, thereby enabling concentration of the end portion of the optical fiber array.

BRIEF DESCRIPTION OF THE DRAWINGS

The present invention will become more apparent from the following detailed description when taken in conjunction with the accompanying drawing in which.

DETAILED DESCRIPTION OF THE INVENTION

Embodiments of the present invention will be described herein below with reference to the accompanying drawings. For the purposes of clarity and simplicity, well-known functions or constructions are not described in detail as they would obscure the invention in unnecessary detail.

Figure 3:
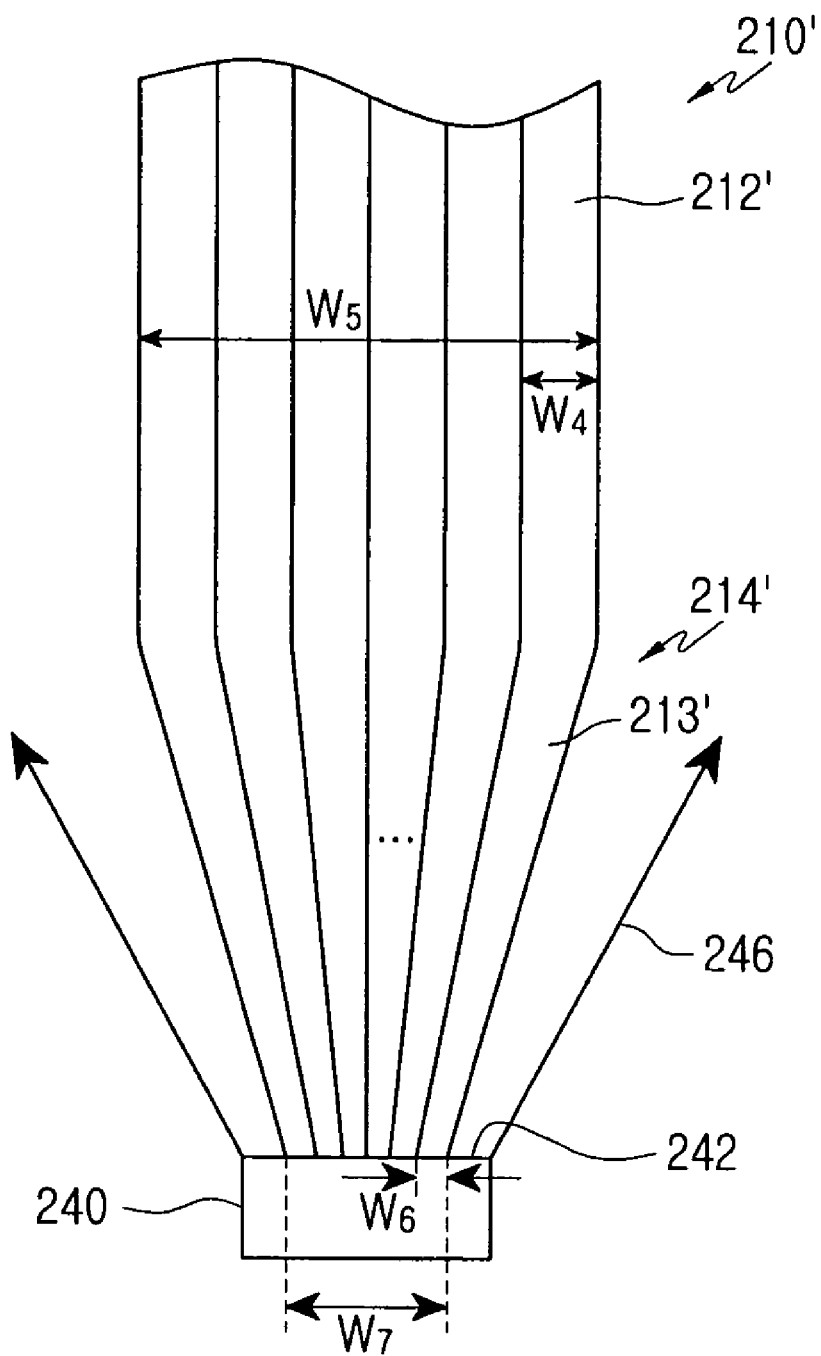
FIG. 3 is a plan view of an optical fiber array module according to a first preferred embodiment of the present invention.
Figure 4:
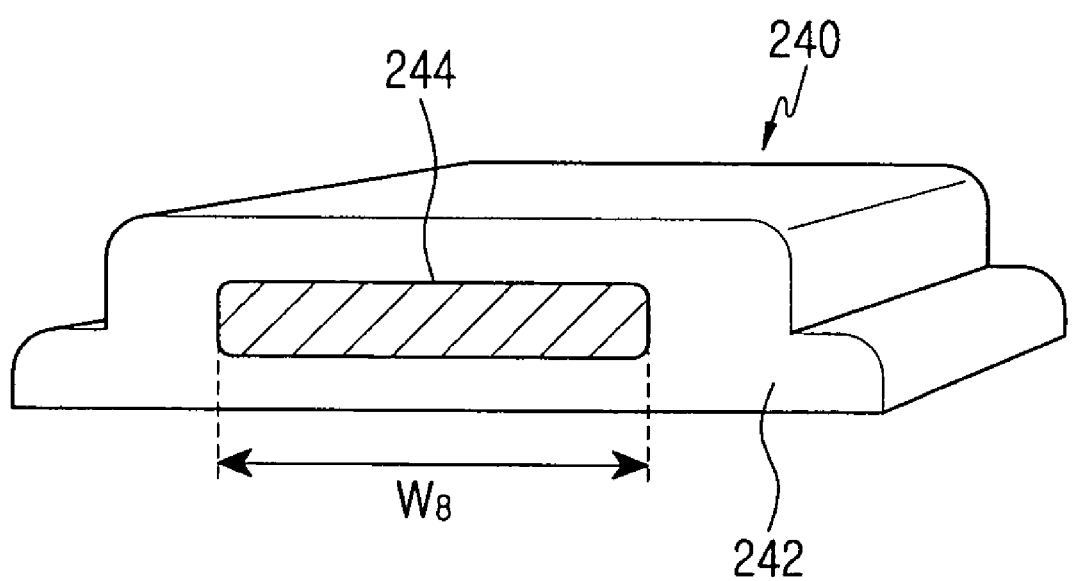
FIG. 4 is a perspective view of a light emitting device illustrated in FIG. 3.
Figure 5:
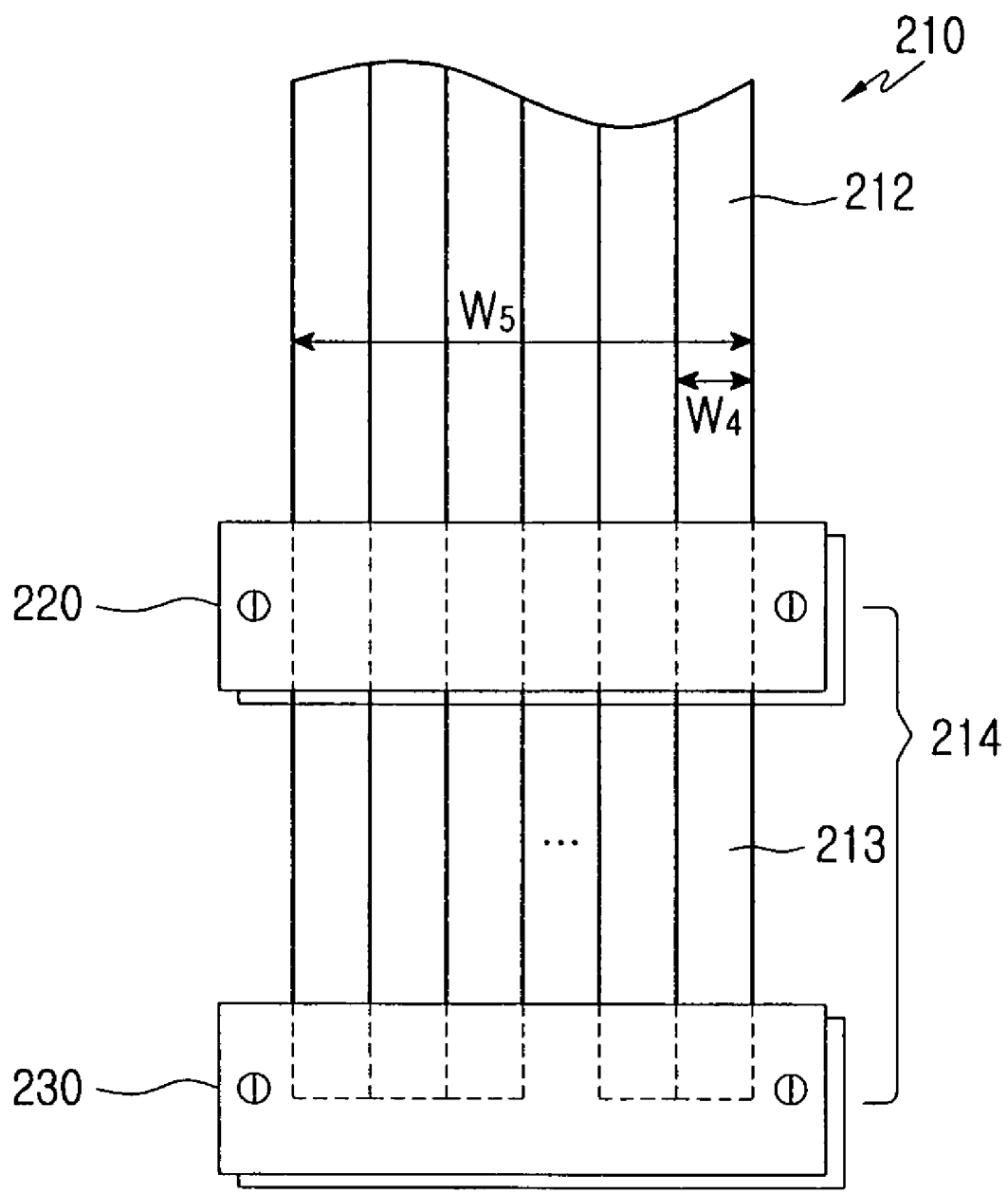
FIGS. 5 and 6 are plan views for explaining a method of extending an optical fiber array illustrated in FIG. 3.
Figure 6:
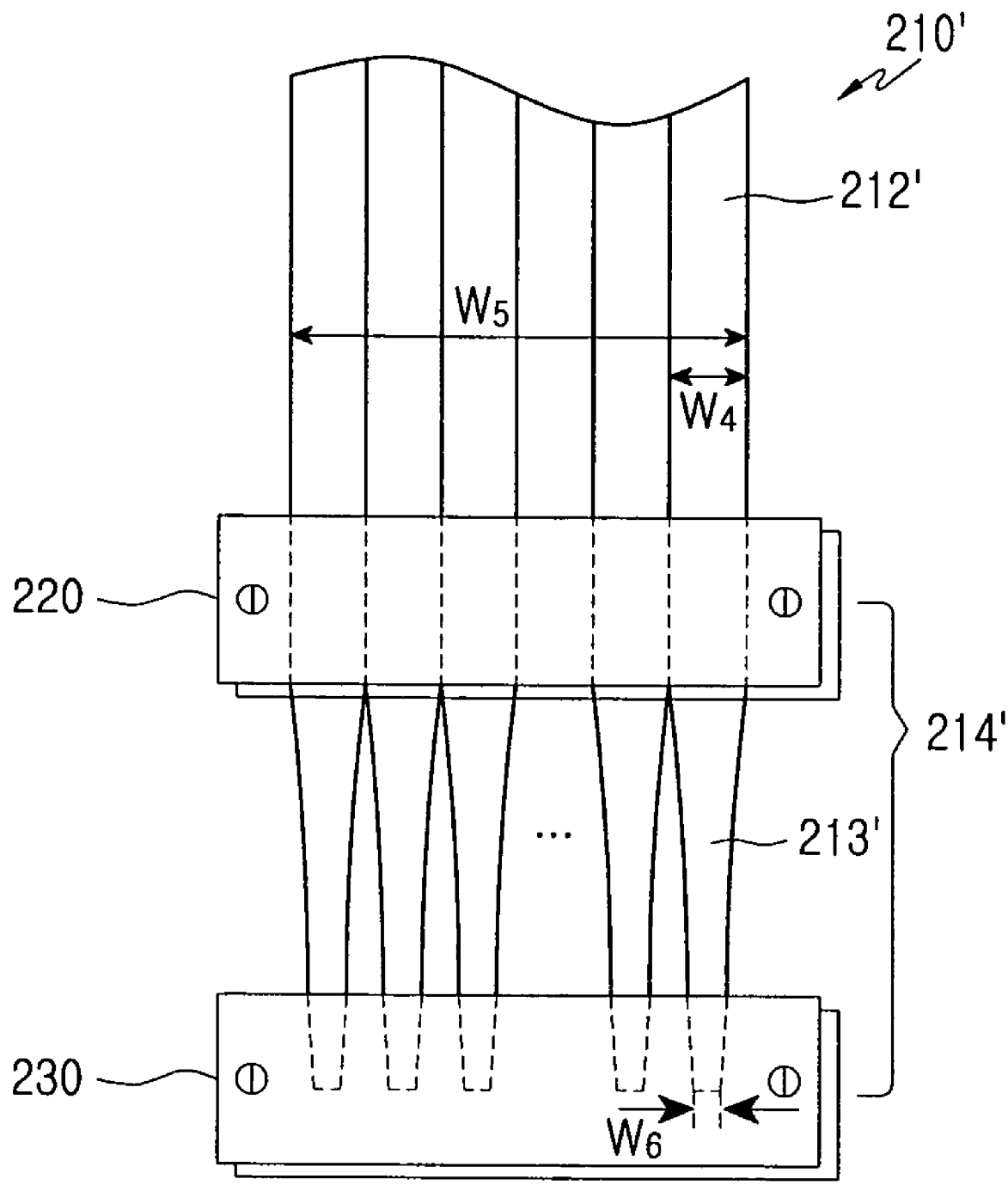

FIG. 3 is a plan view of an optical fiber array module 200 according to a first preferred embodiment of the present invention. FIG. 4 is a perspective view of a light emitting device 240 illustrated in FIG. 3. FIGS. 5 and 6 are plan views for explaining a method of extending an optical fiber array illustrated in FIG. 3. Referring to FIGS. 3 to 6, the optical fiber array module 200 includes a light emitting device 240 to generate light and an extended optical fiber array 210', to couple a light beam 246 emitted from the light emitting device 240 therein.

The light emitting device 240 includes a rectangular type window 244 on one side surface 242 thereof. The light emitting device 240 emits the light beam 246 having a pre-set divergence angle from the window 244. Illustratively, a width $W_8$ of the window 244 is 1.9 mm, and a length of the window 244 is 0.46 mm. A conventional side view LED can be used as the light emitting device 240.

The extended optical fiber array 210' is composed of 28-core extended optical fibers 212', Each optical fiber is an optical transmission medium. and the extended optical fiber array 210' can also selectively include a protection layer of a resin substance, which is coated on the outer surface of the extended optical fibers 212', to fix the extended optical fibers 212'. If the extended optical fiber array 210' includes the protection layer, a protection layer portion coated on an end portion 214' of the extended optical fiber array 210' is removed for an extension process described later. Each of the extended optical fibers 212' includes a core and a clad. The core has a high refractive index, in which light travels with total reflection. The clad has a low refractive index, surrounding the core. Illustratively, a width $W_5$ of the extended optical fiber array 210' is 7 mm, and a diameter $W_4$ of each of the extended optical fibers 212' is 0.25 mm. An end portion 213' of each of the extended optical fibers 212' has a diameter gradually shorter in the end direction, and a diameter $W_6$ of the end of each of the extended optical fibers 212' is 0.17 mm. The end portion 214' of the extended optical fiber array 210' is concentrated so that the ends of the extended optical fibers 212' are laid in three layers. According, the width of the extended optical fiber array 210' is gradually narrower in the end direction, and a width $W_7$ of the end of the extended optical fiber array 210' is narrower than 1.9 mm. That is, the width $W_7$ of the end of the extended optical fiber array 210' is set to be equal to or narrower than the width $W_8$ of the window 244. The end of the extended optical fiber array 210' closely faces or adheres to the window 244.

The end portion 213' of each of the extended optical fibers 212' is gradually thinner in the end direction by the extension process. The extension process of the extended optical fiber array 210 will now be described.

FIG. 5 is a plan view of an original optical fiber array 210 before the extension process is performed. FIG. 6 is a plan view of the extended optical fiber array 210'.

First and second clips 220 and 230 are assembled on an end portion 214 of the original optical fiber array 210. The original optical fiber array 210 has a uniform width $W_5$. The second clip 230 fixes the end of the original optical fiber array 210. The first clip 220 fixes a portion apart a predetermined distance from the end of the original optical fiber array 210.

The end portion 214 of the original optical fiber array 210 is extended by moving the second clip 230 in a farther direction from the first clip 220. For example, extending the end of the original optical fiber array 210, while heating the end portion 214 of the original optical fiber array 210 at 80~90° C. To make a diameter of the end of each of original optical fibers 212 from 0.25 mm to 0.17 mm, it is preferable that an extension rate of the end portion 214' of the extended optical fiber array 210' be substantially 60%. For example, If the length of the end portion 214 of the original optical fiber array 210 is L0 and the length of the end portion 214' of the extended optical fiber array 210' is L, the extension rate is defined as (L−L0)/L0×100.

As described above, the end portion 214' of the extended optical fiber array 210' is concentrated so that the ends of the extended optical fibers 212' are laid in three layers as illustrated in FIG. 3. To maintain a concentrated state of the end portion 214' of the extended optical fiber array 210', a bonding agent may be coated on the end portion 214' of the extended optical fiber array 210'.

Figure 7:
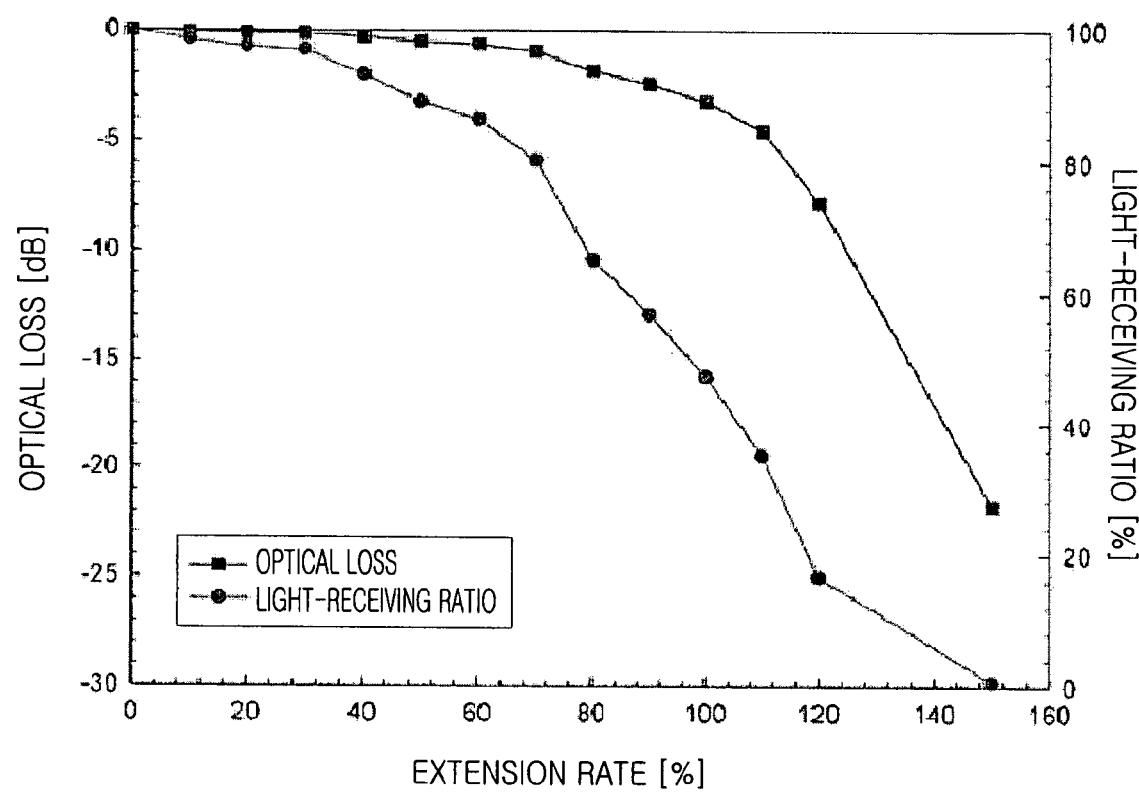
FIG. 7 is a graph illustrating optical loss and light-receiving ratio characteristics according to an extension rate of an optical fiber.

FIG. 7 is a graph illustrating optical loss and light-receiving ratio characteristics according to an extension rate of an optical fiber. In FIG. 7, the optical fiber has a predetermined length. If the optical fiber is extended, diffusion and distinction characteristics of the optical fiber vary. In this manner, optical loss is varied indicating a power ratio of output light to input light and a light-receiving ratio indicating a power ratio of transmitted light to input light according to the extension rate. As illustrated in FIG. 7, when the extension rate is 60%, the light-receiving ratio is reduced to 85%.

The optical loss and the light-receiving ratio of the extended optical fiber array 210' are inferior than those of the original optical fiber array 210. However, optical coupling efficiency increases, since the end of the extended optical fiber array 210' closely faces or adheres to the window 244.

A concentrator for concentrating an end portion of an extended optical fiber array will be described in a second preferred embodiment of the present invention.

When an end portion of an optical fiber array is concentrated using the concentrator according to the second preferred embodiment, it will be understood by those skilled in the art that a non-extended optical fiber array can be used. Thus, if the diameter of each of optical fibers included in the non-extended optical fiber array is small enough, the area of the end of the non-extended optical fiber array, which is concentrated using the concentrator, can be equal to or less than an area of a window of a light emitting device. In this case, it is not necessary to extend of the end of the non-extended optical fiber array to align the end of the non-extended optical fiber array and the window of the light emitting device.

Figure 8:
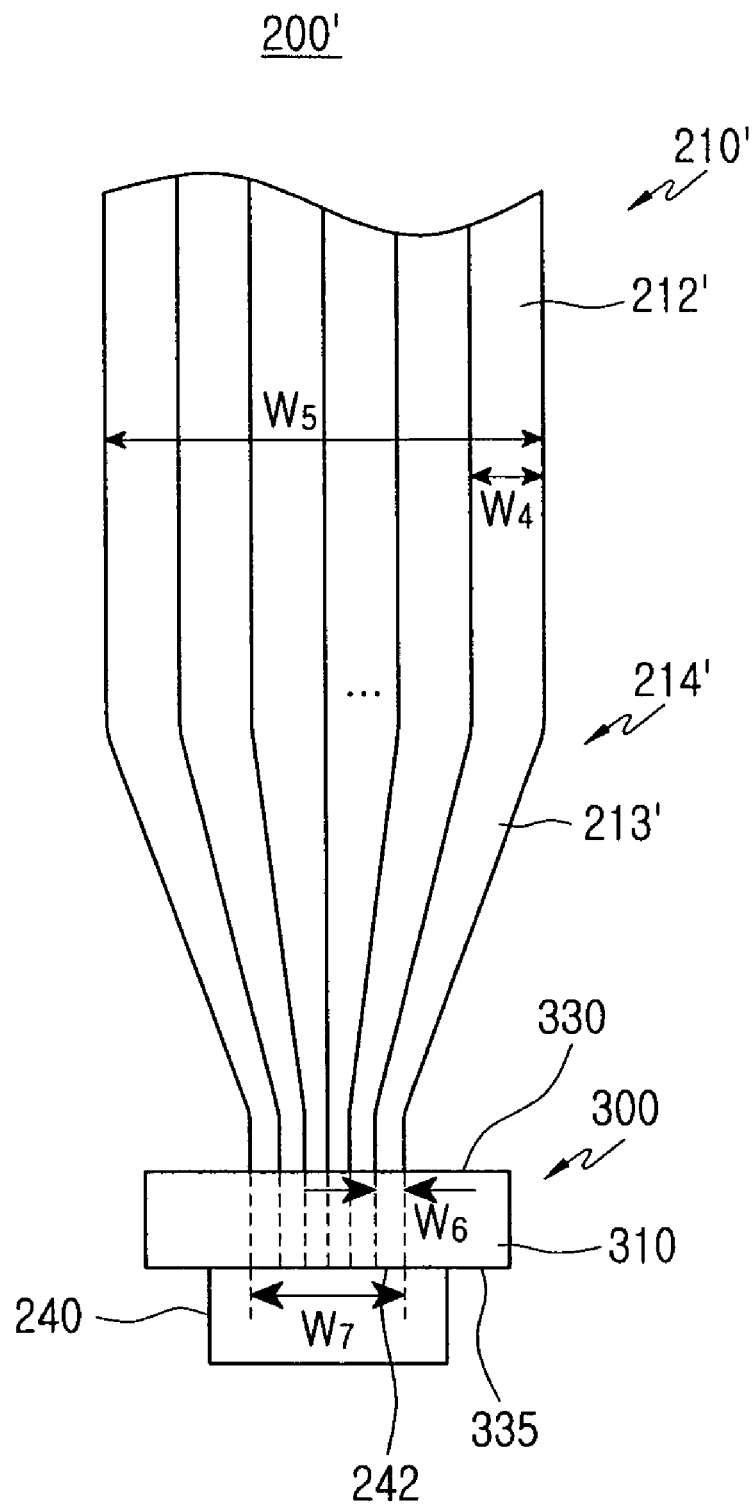
FIG. 8 is a plan view of an optical fiber array module according to a second preferred embodiment of the present invention.
Figure 9:
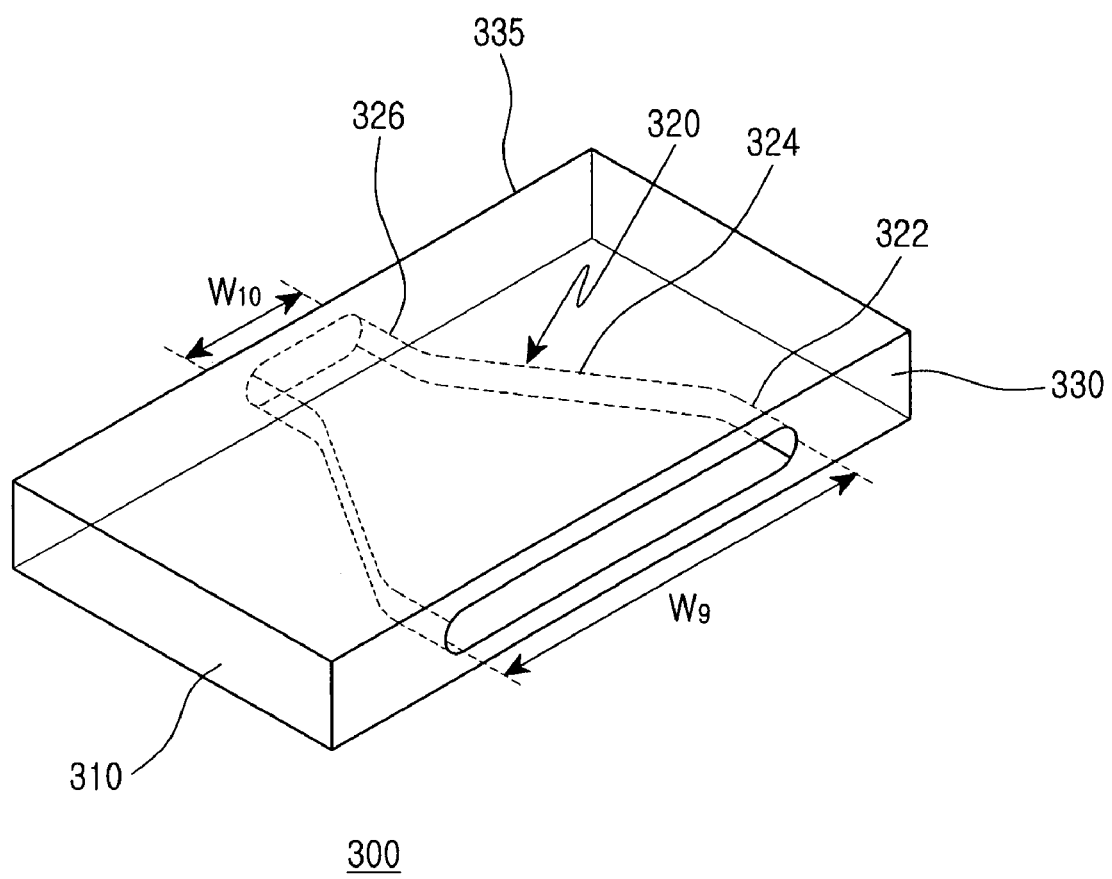
FIG. 9 is a perspective view of a concentrator illustrated in FIG. 8.

FIG. 8 is a plan view of an optical fiber array module 200' according to the second preferred embodiment of the present invention. FIG. 9 is a perspective view of a concentrator 300 illustrated in FIG. 8. Since the optical fiber array module 200' is the same as the optical fiber array module 200 of FIG. 3 except that the optical fiber array module 200' further includes the concentrator 300, the same or similar elements are denoted by the same reference numerals. The description of these elements is omitted.

Referring to FIGS. 8 and 9, the concentrator 300 includes a rectangular type base plate 310 and a through-hole 320 formed to penetrate first and second side surfaces 330 and 335 of the base plate 310 and having a rectangular cross section. The first and second side surfaces 330 and 335 are located opposite to each other. The through-hole 320 is extended from the first side surface 330 to the second side surface 335 and has a width gradually narrower in a direction from the first side surface 330 to the second side surface 335. The through-hole 320 includes a guiding part 322 having the widest uniform width $W_9$, a taper part 324 extended from the guiding part 322 and having a width gradually narrower, and an aligning part 326 extended from the taper part 324 and having the narrowest uniform width $W_{10}$. The width $W_{10}$ of the aligning part 326 is equal to or narrower than the width $W_8$ of the window 244 of the light emitting device 240. Preferably the width $W_{10}$ is set to be a slightly narrower than the width $W_8$ of the window 244 of the light emitting device 240.

The end portion 214' of the extended optical fiber array 210' is inserted into the through-hole 320 of the concentrator 300. The end portion 214' is concentrated while passing through the taper part 324. The ends of the extended optical fibers 212' are closely aligned in three layers in the aligning part 326.

The second side surface 335 of the concentrator 300 closely faces or adheres to the side surface 242 of the light emitting device 240. Further, the end of the extended optical fiber array 210' faces the window 244 of the light emitting device 240.

A portable terminal using the optical fiber array module 200' will be described in a third preferred embodiment of the present invention. The portable terminal includes a keypad having a plurality of key tops and a printed circuit board (PCB) having a plurality of switches respectively aligned with the plurality of key tops. If a user presses a certain key top, a switch aligned with the pressed key top is activated. The extended optical fiber array 210' of the optical fiber array module 200' illuminates the key tops of the keypad. The extended optical fiber array 210' is disposed between the keypad and the PCB. Moreover, the extended optical fiber array 210' has a pattern to output a portion of light corresponding to each of the key tops toward each of the key tops. The pattern can be formed by scratching the surface of the extended optical fiber array 210'. In this case, by scratching cores of the extended optical fiber array 210', light traveling with total reflection in each of the cores is output outside each of the cores resulting from the scratch breaking a total reflection condition.

Figure 1:
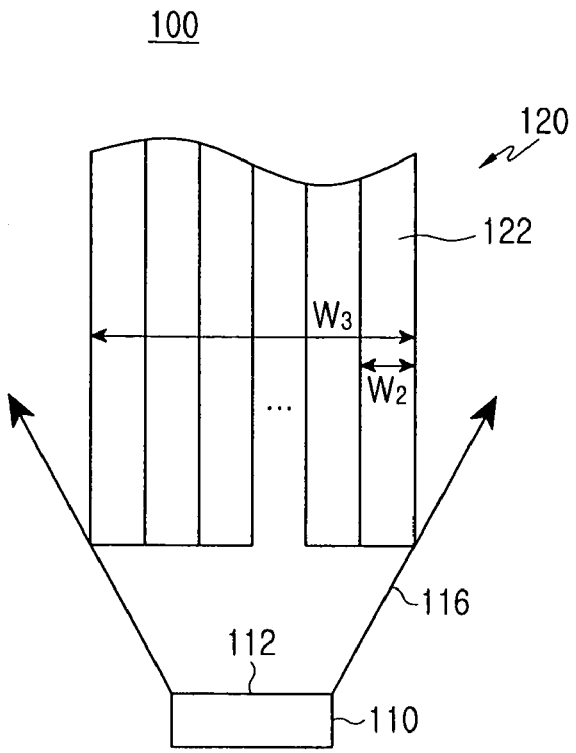
FIG. 1 is a plan view of a conventional optical fiber array module.
Figure 2:
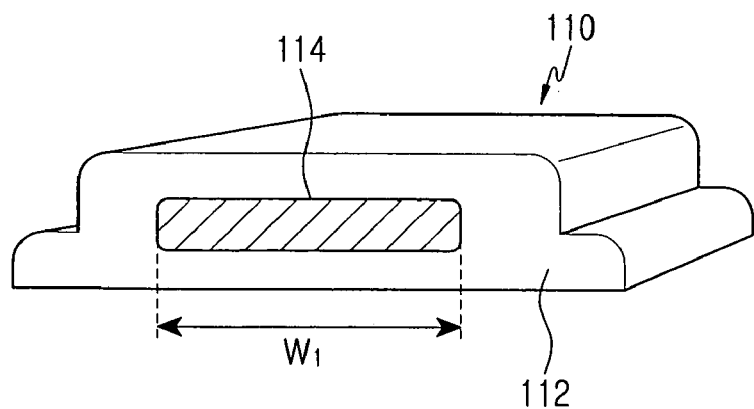
FIG. 2 is a perspective view of a side view LED illustrated in FIG. 1.
Figure 10:
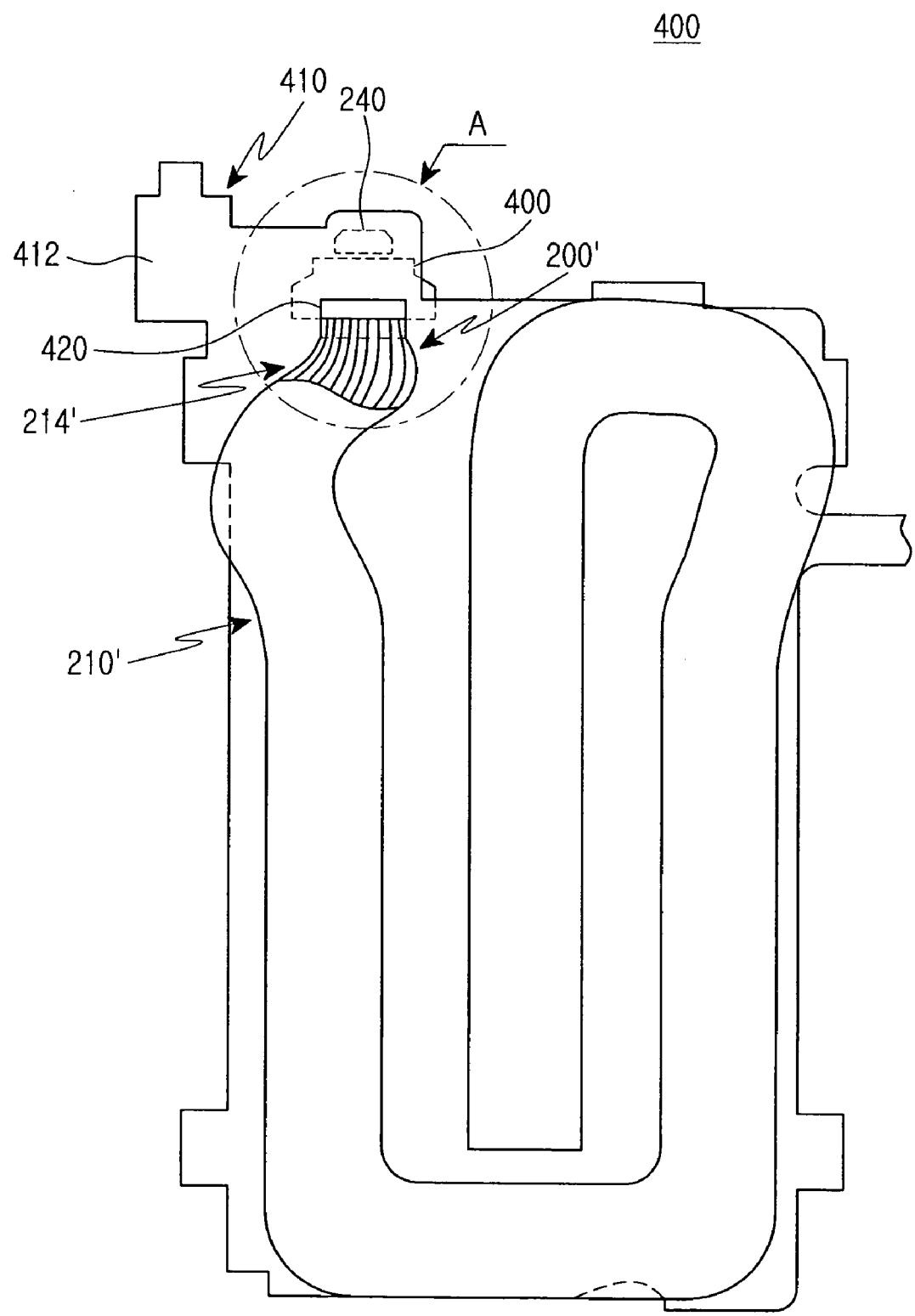
FIG. 10 is a plan view of a portion of a portable terminal according to a third preferred embodiment of the present invention.

FIG. 10 is a plan view of a portion of a portable terminal 400 according to the third preferred embodiment of the present invention. FIG. 1 is a magnified bottom view of a circle A of FIG. 10. The portable terminal 400 illustrated in FIG. 10 includes the optical fiber array module 200' illustrated in FIG. 8. Thus, the same or similar elements are denoted by the same reference numerals. The description of these elements is omitted.

FIG. 10 shows a PCB 410. The PCB has a plurality of switches (not shown) thereon. The extended optical fiber array 210' disposed on a top surface 412 of the PCB 410 to cover the plurality of switches. The concentrator 300 and the light emitting device 240 are disposed on a bottom surface 414 of the PCB 410. The plurality of switches is respectively aligned with a plurality of key tops (not shown). The extended optical fiber array 210' is bent in a pre-set shape on the top surface 412 of the PCB 410 to illuminate the key tops.

The PCB 410 has a hole 420 penetrating between the top surface 412 and the bottom surface 414 on an edge thereof. The end portion 214' of the extended optical fiber array 210' is extended to the window 244 of the light emitting device 240 disposed on the bottom surface 414 of the PCB 410 by passing through the hole 420.

Figure 11:
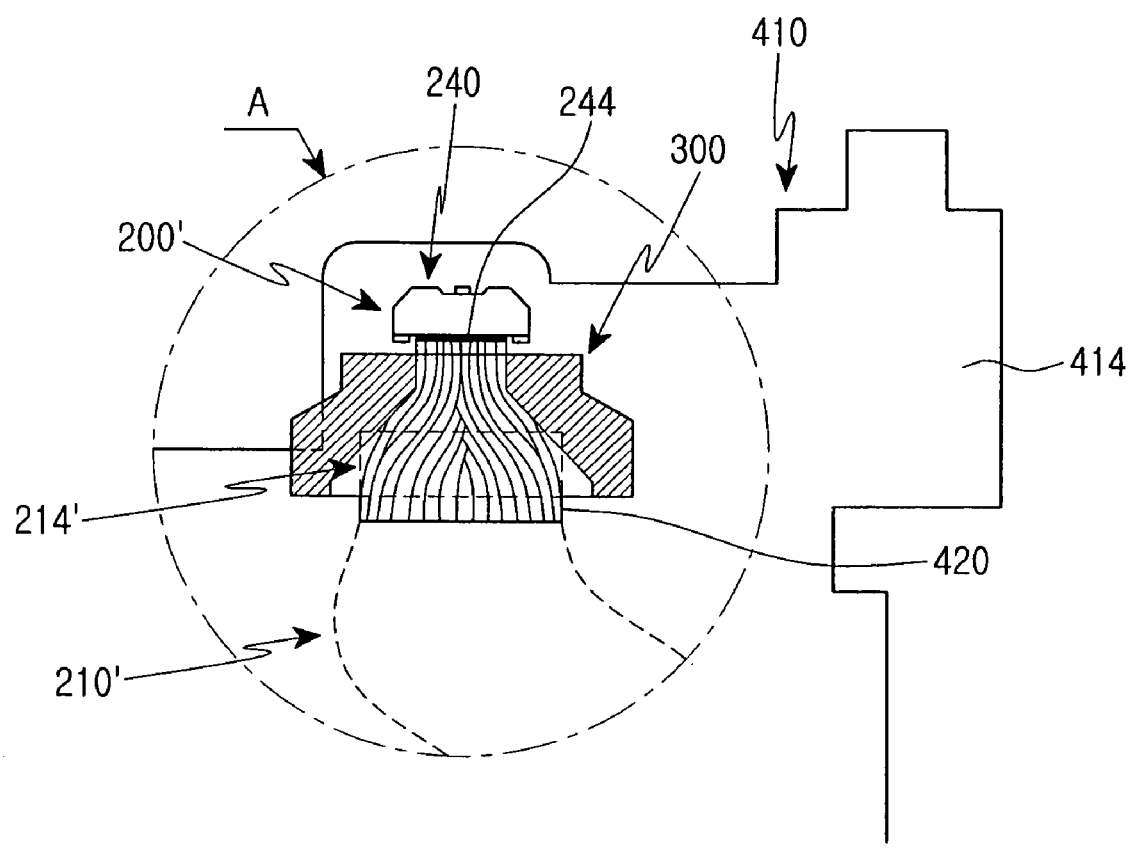
FIG. 11 is a magnified bottom view of a circle A of FIG. 10.

Referring to FIG. 11, the window 244 of the light emitting device 240 faces the through-hole 320 of the concentrator 300. For convenience of understanding, the concentrator 300 is shown as a cross sectional view in FIG. 11. The end portion 214' of the extended optical fiber array 210' is inserted into the through-hole 320 of the concentrator 300 and concentrated while passing through the through-hole 320. The end of the extended optical fiber array 210' is aligned to face the window 244 of the light emitting device 240.

As described above, in an optical fiber array module, a fabrication method thereof, and a portable terminal according to the present invention, by extending an end portion of an optical fiber array and aligning it with a light emitting device, the distance between a window of the light emitting device and the end of the optical fiber array is minimized. Thus, the optical coupling efficiency maximized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber array module comprising:
    a light emitting device to emit light having a pre-set divergence angle through a side surface thereof;
    an optical fiber array having a plurality of optical fibers; and
    a concentrator including a first side surface, a second side surface facing the side surface of the light emitting device, and a through-hole extended from the first side surface to the second side surface, wherein the through-hole has a width gradually narrower in a direction from the first side surface to the second side surface, wherein an end portion of the optical fiber array is inserted into the through-hole, thereby enabling concentration of the end portion of the optical fiber array;
    wherein the side surface of the light emitting device has a window;
    wherein the end portion of the optical fiber array is aligned with the window of the light emitting device at a distance there between to permit the end portion of the fiber array to be adhered to the window; and
    wherein the end portion of each of the optical fibers included in the optical fiber array is extended so that the end portion of the optical fiber array is gradually thinner, and an extension rate of the end portion is about 60 percent of the length of the end portion prior to being extended.

2. A method of fabricating an optical fiber array module, the method comprising the steps of:
(a) providing an optical fiber array comprising a plurality of optical fibers;
(b) extending an end portion of the optical fiber array;
(c) concentrating the end portion of the extended optical fiber array; and
(d) aligning a light emitting device and the concentrated optical fiber array so that a side surface of the light emitting device faces the end of the optical fiber array;
wherein the end portion of the optical fiber array is aligned with the side surface of the light emitting device at a distance there between to permit the end portion of the optical fiber array to be adhered to the side surface; and
wherein the surface of the optical fiber array is scratched to form at least one pattern to output a portion of light traveling inside of the optical fiber array to outside of the optical fiber array.

3. A method of fabricating an optical fiber array module, the method comprising the steps of:
(a) providing an optical fiber array comprising a plurality of optical fibers;
(b) extending an end portion of the optical fiber array;
(c) concentrating the end portion of the extended optical fiber array; and
(d) aligning a light emitting device and the concentrated optical fiber array so that a side surface of the light emitting device faces the end of the optical fiber array;
wherein the end portion of the optical fiber array is aligned with the side surface of the light emitting device at a distance there between to permit the end portion of the optical fiber array to be adhered to the side surface; and
wherein step (b) comprises the steps of:
fixing the end of the optical fiber array and a portion apart a pre-set distance from the end of the optical fiber array; and
extending the end of the optical fiber array while heating the end portion of the optical fiber array, wherein an extension rate of the end portion is about 60 percent of the length of the end portion prior to being extended.

4. The method of claim 2, wherein step (d) comprises adhering the end of the extended and concentrated optical fiber array to the side surface of the light emitting device.

5. A portable terminal comprising:
a printed circuit board (PCB) having a plurality of switches;
a light emitting device arranged on the PCB for emitting light having a pre-set convergence angle through a side surface thereof;
an optical fiber array having a plurality of optical fibers disposed on the PCB to cover the plurality of switches; and
a concentrator in contact with an end portion of the optical fiber array, said concentrator having a first side surface, a second side surface facing the side surface of the light emitting device, and a through-hole extended from the first side surface to the second side surface, wherein the through-hole has a width gradually narrower in a direction from the first side surface to the second side surface, wherein the end portion of the optical fiber array is inserted into the through-hole, thereby enabling concentration of the end portion of the optical fiber array.

6. The portable terminal of claim 5, wherein the side surface of the light emitting device has a window or opening.

7. The portable terminal of claim 5, wherein the optical fibers of the plurality of optical fibers are each optical transmission mediums.

8. The portable terminal of claim 5, wherein the end portion of each of the optical fibers included in the optical fiber array is extended so that the end portion of the optical fiber array is gradually thinner, and an extension rate of the end portion is about 60 percent of the length of the end portion prior to being extended.

9. The portable terminal of claim 6, wherein the end of the optical fiber array is adhered to the window of the light emitting device.

10. The portable terminal of claim 9, wherein a width of the concentrated end of the optical fiber array is equal to or narrower than a width of the window of the light emitting device.

11. The portable terminal of claim 5, wherein the through-hole comprises:
a guiding part having a uniform width;
a taper part extended from the guiding part and having a width gradually narrower; and
an aligning part extended from the taper part and having a uniform width narrower than the width of the guiding part.

12. The portable terminal of claim 11, wherein the width of the aligning part is equal to or narrower than a width of a window of the light emitting device.

13. The portable terminal of claim 5, wherein the light emitting device is disposed on a bottom surface of the PCB and the optical fiber array is disposed on a top surface of the PCB.

14. The portable terminal of claim 5, wherein the optical fiber array has patterns to output a portion of light traveling inside of the optical fiber array to outside of the optical fiber array.

15. The portable terminal of claim 14, wherein each of the patterns is aligned with a corresponding one of the plurality of switches.

* * * * *